United States Patent
Lee (10) Patent No.: US 11,556,392 B2
(45) Date of Patent: Jan. 17, 2023

(54) CLOUD ACCESS METHOD FOR IOT DEVICES, AND DEVICES PERFORMING THE SAME

(71) Applicant: ELECTRONICS AND TELECOMMUNICATIONS RESEARCH INSTITUTE, Daejeon (KR)

(72) Inventor: Joo Chul Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 17/368,015

(22) Filed: Jul. 6, 2021

(65) Prior Publication Data

US 2022/0012101 A1    Jan. 13, 2022

(30) Foreign Application Priority Data

Jul. 10, 2020  (KR) .................. 10-2020-0085329
Jan. 14, 2021  (KR) .................. 10-2021-0005173

(51) Int. Cl.
  *G06F 9/50*  (2006.01)
(52) U.S. Cl.
  CPC .......... *G06F 9/5072* (2013.01); *G06F 9/5011* (2013.01); *G06F 9/5027* (2013.01)
(58) Field of Classification Search
  CPC ..... G06F 9/5072; G06F 9/5011; G06F 9/5027
  See application file for complete search history.

(56) References Cited

U.S. PATENT DOCUMENTS

| | | | |
|---|---|---|---|
| 9,606,817 B1* | 3/2017 | Efstathopoulos | G06F 9/5027 |
| 10,742,744 B1* | 8/2020 | Mahalank | H04L 67/51 |
| 2016/0128043 A1* | 5/2016 | Shuman | H04W 72/044 |
| | | | 370/329 |
| 2016/0135241 A1* | 5/2016 | Gujral | H04W 76/14 |
| | | | 370/328 |
| 2017/0149937 A1* | 5/2017 | Ren | H04W 4/70 |
| 2017/0325125 A1* | 11/2017 | Novo Diaz | H04W 28/06 |
| 2018/0288179 A1* | 10/2018 | Bhatia | H04L 69/163 |

(Continued)

FOREIGN PATENT DOCUMENTS

KR    10-2017-0089119 A    8/2017

OTHER PUBLICATIONS

Shelby et al., "RFC 7252—The Contrained Application Protocol (CoAP)", Jun. 2014, https://www.rfc-editor.org/rfc/pdfrfc/rfc7252.txt.pdf, whole document.*

(Continued)

*Primary Examiner* — Douglas B Blair
(74) *Attorney, Agent, or Firm* — LRK Patent Law Firm (57) ABSTRACT

A cloud access method of an internet of things (IoT) device and devices performing the cloud access method are disclosed. The cloud access method using a cloud proxy function includes receiving a first resource retrieval request of a client device from a cloud, extracting, from the first resource retrieval request, a device identification (ID) of a device including a resource for which a resource retrieval is requested, and transmitting a second resource retrieval request of the client device to the device based on the device ID.

20 Claims, 7 Drawing Sheets

(56) References Cited

U.S. PATENT DOCUMENTS

2019/0116058 A1* 4/2019 Kaliappan ............... H04W 4/38
2020/0007414 A1* 1/2020 Smith ................... G06F 9/5072
2020/0169553 A1   5/2020 Lee
2020/0257570 A1   8/2020 Son et al.
2021/0144517 A1* 5/2021 Guim Bernat ........ G06F 9/4881

OTHER PUBLICATIONS

"OCF Device to Cloud Services Specification", Version 2.1 0, Nov. 2019, U.S.A, Open Connectivity Foundation (OCF).

* cited by examiner

CLOUD ACCESS METHOD FOR IOT DEVICES, AND DEVICES PERFORMING THE SAME

CROSS-REFERENCE TO RELATED APPLICATIONS

This application claims the priority benefit of Korean Patent Application No. 10-2020-0085329 filed on Jul. 10, 2020, and Korean Patent Application No. 10-2021-0005173 filed on Jan. 14, 2021, in the Korean Intellectual Property Office, the disclosures of which are incorporated herein by reference for all purposes.

BACKGROUND

1. Field of the Invention

One or more example embodiments relate to a cloud access method of an internet of things (IoT) device, and devices performing the cloud access method.

2. Description of Related Art

In general, internet of things (IoT) devices may operate based on communications in a local network environment in a domain to which IoT is applied. However, an environment that enables access may also be provided even in an external communication network environment that is separate from a local area, for example, in a case where a smart appliance of a smart home environment accesses outside a home. For such remote access or external access, a cloud may be mainly used as infrastructure. However, de-facto standard setting organizations that develop IoT standards may develop and provide their own standards associated with the remote access.

For example, the Open Connectivity Foundation (OCF) that develops open IoT standards provides a cloud interworking method for IoT devices through the "OCF device to cloud (D2C) service" specification. For access to a cloud through the D2C service specification, a cloud interworking function that is specified in the D2C specification may need to be implemented in each IoT device.

However, lightweight IoT devices with heavily limited hardware may not implement the cloud interworking function that is specified in the D2C specification.

SUMMARY

A separate external interworking device may be needed to link (or interwork) a lightweight device with a cloud.

An aspect provides a cloud proxy function that links or interworks, with a cloud, devices that do not support a cloud interworking function (e.g., a device-to-cloud (D2C) interworking function) in an internet of things (IoT) platform of the Open Connectivity Foundation (OCF).

Technical aspects are not limited to the foregoing one, and there may be other technical aspects to be solved according to example embodiments to be described hereinafter.

According to an example embodiment, there is provided a cloud access method using a cloud proxy function. The cloud access method may include receiving a first resource retrieval request of a client device from a cloud, extracting, from the first resource retrieval request, a device identification (ID) of a device including a resource for which a resource retrieval is requested, and transmitting a second resource retrieval request of the client device to the device based on the device ID.

The first resource retrieval request may include a proxy-uniform resource identifier (URI) option header, and the proxy-URI option header may be removed from the second resource retrieval request.

The proxy-URI option header may include the device ID.

The device may be a device that has not a cloud interworking function.

The transmitting may include searching for the device ID and endpoint information of the device from a mapping list that is used for managing device-to-device (D2D) devices that have not the cloud interworking function for access to the cloud.

The cloud access method may further include requesting the cloud for registration of a cloud proxy device that supports the cloud proxy function, and receiving an access token for the cloud proxy device that is issued by the requesting for the registration.

The cloud access method may further include receiving a request for registration of the device from a mediator, obtaining the resource of the device, and publishing the resource of the device to the cloud.

The cloud access method may further include generating an object entry corresponding to the device based on the resource and the device ID of the device and storing the generated object entry.

The first resource retrieval request may be a resource retrieval request forwarded by the cloud after being transmitted from the client device to the cloud.

According to another example embodiment, there is provided a cloud proxy device supporting a cloud proxy function. The cloud proxy device may include a memory configured to store therein at least one instruction, and a processor configured to execute the instruction. When the instruction is executed, the processor may receive a first resource retrieval request of a client device from a cloud, extract, from the first resource retrieval request, a device ID of a D2D device including a resource for which a resource retrieval is requested, and transmit a second resource retrieval request of the client device to the D2D device based on the device ID.

The first resource retrieval request may include a proxy-URI option header, and the proxy-URI option header may be removed from the second resource retrieval request.

The proxy-URI option header may include the device ID.

The D2D device may be a device that has not a cloud interworking function.

For the transmitting, the processor may search for the device ID and endpoint information of the D2D device from a mapping list that is used for managing devices that have not the cloud interworking function for access to the cloud.

The process may request the cloud for registration of the cloud proxy device, and receive an access token for the cloud proxy device that is issued by the requesting for the registration.

The processor may receive a request for registration of the D2D device from a mediator, obtain the resource of the D2D device, and publish the resource of the D2D device to the cloud.

The processor may generate an object entry corresponding to the D2D device based on the resource and the device ID of the D2D device and store the generated object entry.

The first resource retrieval request may be a resource retrieval request that is forwarded by the cloud after being transmitted from the client device to the cloud.

The processor may request the cloud for the registration of the cloud proxy device in response to cloud setting provisioning of the mediator.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Hereinafter, example embodiments will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In the description of example embodiments, detailed description of structures or functions that are thereby known after an understanding of the disclosure of the present application will be omitted when it is deemed that such description will cause ambiguous interpretation of the example embodiments.

In addition, terms such as first, second, A, B, (a), (b), and the like may be used herein to describe components. Each of these terminologies is not used to define an essence, order, or sequence of a corresponding component but used merely to distinguish the corresponding component from other component(s). Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings.

Figure 1:
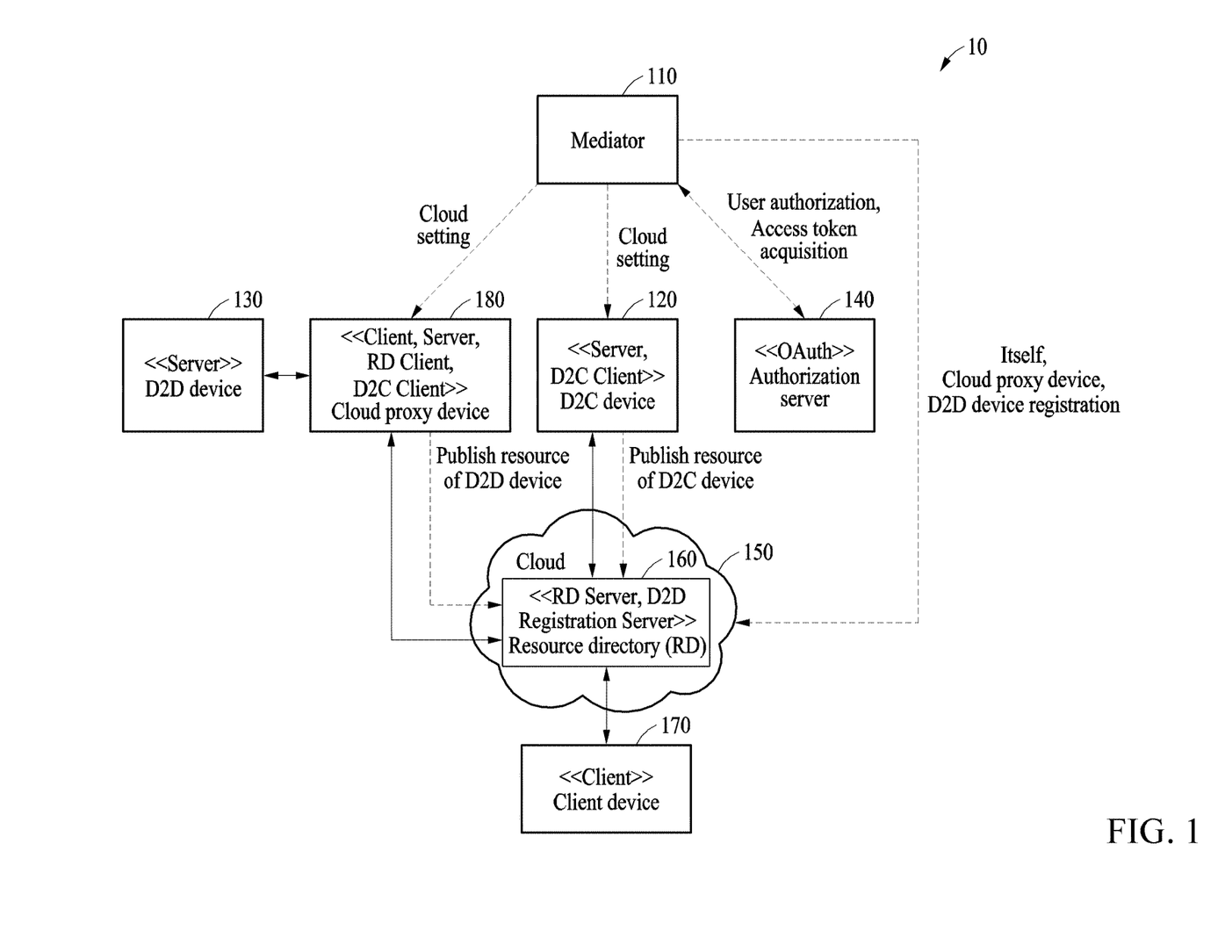
FIG. 1 is a diagram illustrating an example of a cloud system that provides a cloud proxy function according to an example embodiment.
Figure 2:
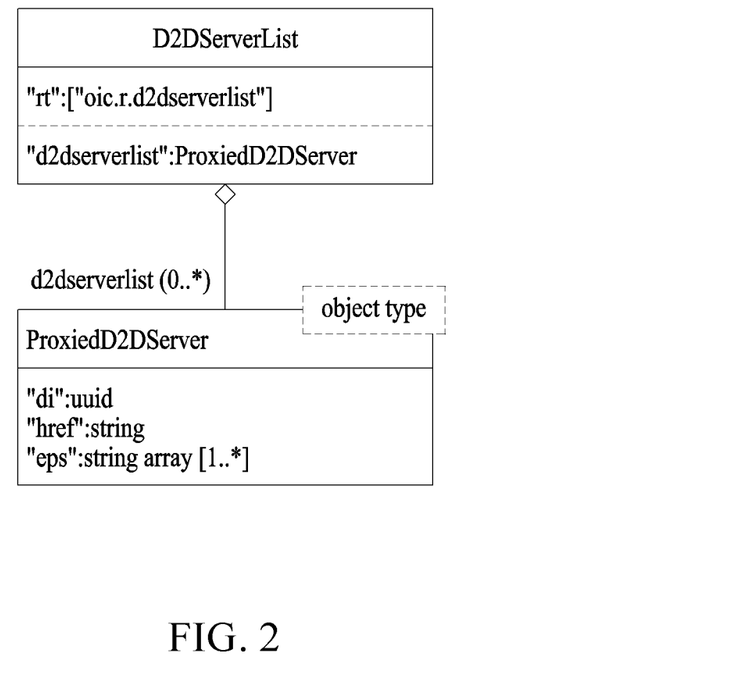
FIG. 2 is a diagram illustrating an example of a structure of a mapping list managed by a cloud proxy device according to an example embodiment.

FIG. 1 is a diagram illustrating an example of a cloud system that provides a cloud proxy function according to an example embodiment. FIG. 2 is a diagram illustrating an example of a structure of a mapping list managed by a cloud proxy device according to an example embodiment.

A cloud system 10 may provide a cloud proxy function that allows internet of things (IoT) devices that do not support a cloud interworking function to interwork with a cloud 150. The cloud system 10 may provide the cloud proxy function based on a cloud interworking function that is specified in the device-to-cloud (D2C) service standard of the Open Connectivity Foundation (OCF) in an OCF IoT platform. However, the cloud proxy function is not limited thereto, but is applicable to cloud interworking in other IoT platforms instead of the OCF IoT platform.

The cloud system 10 may include a mediator 110, a D2C device 120, a device-to-device (D2D) device 130, an authorization server 140, the cloud 150, a resource directory (or RD as illustrated) 160, a client device 170, and a cloud proxy device 180. The mediator 110 may be an object that performs an operation of registering, in the cloud 150, a device that attempts to interwork with the cloud 150. The D2C device 120 may be a device that performs cloud interworking, for example, a server device in which a cloud interworking function is provided. The D2D device 130 may be a device that does not perform cloud interworking, for example, a server device in which the cloud interworking function is not provided. The authorization server 140 may be an OAuth authorization server, for example. The resource directory 160 may register therein resources possessed by devices (e.g., third devices, the D2C device 120, and the D2D device 130), and transmit a list of the registered resources by proxy of the devices in response to a resource retrieval request being received from outside. The term "by proxy of something" used herein may indicate "instead of" or "in place of" something. The client device 170 may be a client that accesses a server device (e.g., the D2C device 120, the D2D device 130, and the authorization server 140)

through the cloud 150. The components—for example, the mediator 110, the D2C device 120, the D2D device 130, the authorization server 140, the resource directory 160, and the client device 170—excluding the cloud proxy device 180, in the cloud system 10 may be specified in detail in the OCF D2C standard.

The cloud proxy device 180 may support the D2D device 130 to allow the D2D device 130 that is not capable of performing cloud interworking to interwork with the cloud 150. For example, the cloud proxy device 180 may support a function by which the D2D device 130 interworks with the cloud 150 through the cloud proxy device 180. The cloud proxy device 180 may register, in the resource directory 160, the D2D device 130 (e.g., the D2D device 130 and resources of the D2D device 130) by proxy of the D2D device 130. That is, the cloud proxy device 180 may perform a role of a D2C client in which the cloud interworking function is provided.

The cloud proxy device 180 may manage a separate mapping list (e.g., D2DServerList) for managing D2D devices that access the cloud 150 through the cloud proxy device 180. The mapping list may have a resource structure illustrated in FIG. 2. Table 1 below defines resources in "oic.r.d2dserverlist." Table 2 below defines properties (or interchangeably "attributes" herein) of the resources in "oic.r.d2dserverlist." Table 3 below defines object types in "d2dserver" (e.g., ProxiedD2DServer).

TABLE 1

| Pre-defined URI | Resource Type Title | Resource Type ID ("rt" value) | OCF Interfaces | Description | Related Functional Interaction |
|---|---|---|---|---|---|
| "/example/d2dserverlist URI" | D2D Server Device List | "oic.r.d2dserverlist" | "oic.if.baseline," "oic.if.rw" | This resource is used when a cloud proxy device forwards a message received from an OCF RD to a D2D device by proxy of the D2D device in response to a request for access to a resource registered in an OCF RD. | Discovery |

TABLE 2

| Property title | Property name | Value type | Value rule | Unit | Access mode | Mandatory | Description |
|---|---|---|---|---|---|---|---|
| D2D Server Device List | "d2dserverlist" | "d2dserver" | N/A | N/A | R | Yes | D2D device ID and resource URI that are managed by a clod proxy, and endpoint information for access are stored in a form of an arrangement. |

TABLE 3

| Property title | Property name | Value type | Value rule | Access mode | Mandatory | Description |
|---|---|---|---|---|---|---|
| Device ID | "di" | "uuid" | N/A | R | Yes | Device ID of a D2D device that accesses a cloud through this cloud proxy |
| Resource URI | "href" | "string" | N/A | R | No | Path of a certain resource to be accessed through "eps" This value may be omitted when the "eps" attribute is not explicitly included in a response message to a "/oic/res" resource read request transmitted from the D2D device. |
| End Point | "eps" | "string" | Array | R | Yes | Endpoint information to be used for access to "uri" An "uri" attribute value may be omitted, and an endpoint may be implicitly generated with a D2D device IP and port information, |

TABLE 3-continued

| Property title | Property name | Value type | Value rule | Access mode | Mandatory | Description |
|---|---|---|---|---|---|---|
| | | | | | | when the "eps" attribute is not explicitly included in a response message to an "/oic/res" resource read request transmitted from the D2D device. |

For operations of the cloud proxy device 180, an extension attribute may be added to an account resource (e.g., "oic.r.account" resource). The account resource may be used to register and manage an allowed (or registered) device for which access to the cloud 150 is allowed in the cloud 150 (e.g., an OCF cloud). The account resource may include the definition in the "OCF cloud security" standard. For the operations of the cloud proxy device 180, an example of a property (or an attribute) indicated in Table 4 may be added.

TABLE 4

| Property title | Property name | Value type | Value rule | Access mode | Mandatory | Description |
|---|---|---|---|---|---|---|
| Proxied D2D Device List | "proxied_dis" | "uuid" | array | R | No | This attribute may store a device ID list of D2D devices accessing a cloud through a cloud proxy registered in an OCF cloud. A "di" attribute among existing attributes of an "oic.r.account" resource may be a device ID of the cloud proxy. |

Figure 3:
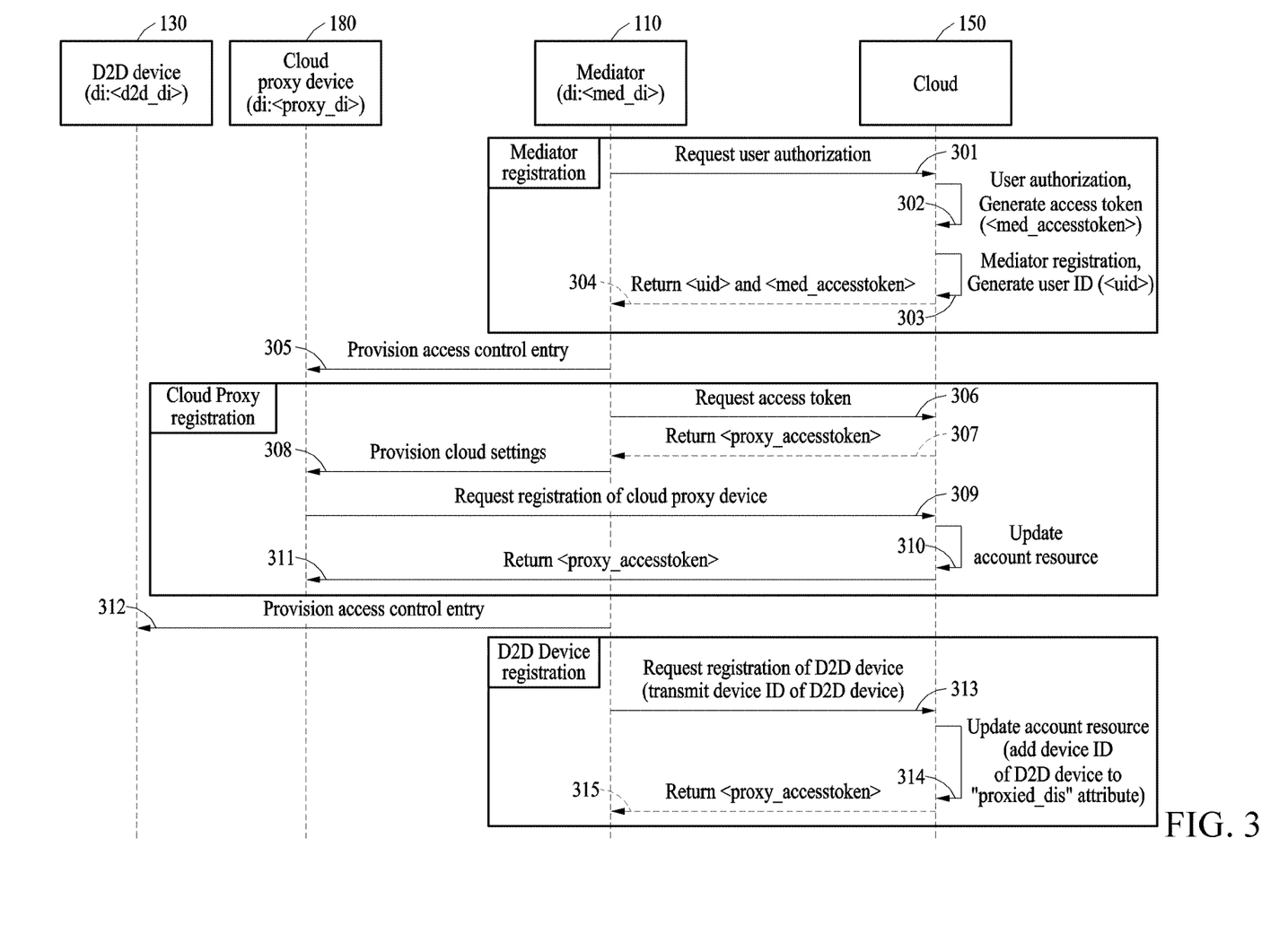
FIG. 3 is a diagram illustrating an example of a flow of operations performed to register a cloud proxy device and a device-to-device (D2D) device in a cloud using a mediator according to an example embodiment.

FIG. 3 is a diagram illustrating an example of a flow of operations performed to register a cloud proxy device and a D2D device in a cloud using a mediator according to an example embodiment.

Operations performed in a communication environment (e.g., a cloud environment) to which the cloud proxy device 180 is applied will be described hereinafter with reference to FIG. 3.

Operations for registration in the cloud 150 may include operations 301 through 304 of registering the mediator 110, operations 306 through 311 of registering the cloud proxy device 180, and operations 313 through 315 of registering the D2D device 130. A device of a cloud user connected to the cloud 150 may be on-board in advance, and the mediator 110 may perform a function as an onboarding tool (OBT). The mediator 110 may obtain an access uniform resource identifier (URI) for access to the cloud 150 and register itself in the cloud 150. Using the registered mediator 110, the cloud proxy device 180 and the D2D device 130 may be registered in the cloud 150.

Operations 301 through 304 may be performed to register the mediator 110 in the cloud 150 after the user of the cloud 150 is authorized through user authentication. In detail, in operation 301, the mediator 110 may request the cloud 150 for user authentication or authorization. For the request for the user authentication or authorization, the mediator 110 may transmit an access token to the cloud 150. The access token may be provided to the mediator 110 after the user of the cloud 150 is logged in through the authorization server 140. In operation 302, the cloud 150 may perform the user authentication and generate an access token (e.g., <med_accesstoken>) for the mediator 110. In operation 303, the cloud 150 may register the mediator 110 may generate a user identification (ID) associated with the mediator 110, for example, a user ID (<uid>) that is to be shared by the mediator 110 and a device to be connected to the cloud 150. In operation 304, the cloud 150 may return the user ID (<uid>) and the access token (<med_accesstoken>) to the mediator 110.

In operation 305, the mediator 110 may provision an access control entry of the cloud proxy device 180 and target devices for communication (e.g., the D2C device 120 and the D2D device 130).

Operations 306 through 311 may be performed to register the cloud proxy device 180 in the cloud 150 by itself. The cloud proxy device 180 may be on-board in the mediator 110 in advance by performing onboarding. In operation 306, the mediator 110 may request the cloud 150 for an access token for the cloud proxy device 180. In operation 307, the cloud 150 may issue an access token (e.g., <proxy_accesstoken>) for the cloud proxy device 180 and return the access token (<proxy_accesstoken>) to the mediator 110. In operation 308, the mediator 110 may provision cloud settings (e.g., CoAPCloudConf Resource) to the cloud proxy device 180.

In operation 309, the cloud proxy device 180 may request the cloud 150 for the registration of the cloud proxy device 180 itself. For the request for the registration, the cloud proxy device 180 may transmit a device ID (e.g., <proxy_di>) of the cloud proxy device 180 to the cloud 150. The request for the registration by the cloud proxy device 180 may include the device ID (e.g., <proxy_di>) of the cloud proxy device 180. In operation 310, the cloud 150 may update an account resource in response to the request for the registration by the cloud proxy device 180. In operation 311, the cloud 10 may return the access token (<proxy_accesstoken>) for the cloud proxy device 180 to the cloud proxy device 180.

In operation 312, the mediator 110 may provision an access control entry of the D2C device 120 and target devices for communication (e.g., the cloud proxy device 180 and the D2D device 130).

Operations 313 through 315 may be performed to register the D2D device 130 in the cloud 150 by the mediator 110. In operation 313, the mediator 110 may request the cloud 150 for registration of the D2D device 130. For the request for the registration of the D2D device 130, the mediator 110 may transmit a device ID (e.g., <d2d_di>) of the D2D device 130 to the cloud 150. The request for the registration of the D2D device 130 may include the device ID (<d2d_di>) of the D2D device 130. In operation 314, the cloud 150 may update an account resource in response to the request for the registration of the D2D device 130. The device ID (<d2d_di>) of the D2D device 130 may be added to an attribute (e.g., a "proxied_dis" attribute) of the account resource. In operation 315, the cloud 150 may return the access token (<proxy_accesstoken>) for the cloud proxy device 180 to the mediator 110.

Figure 4:
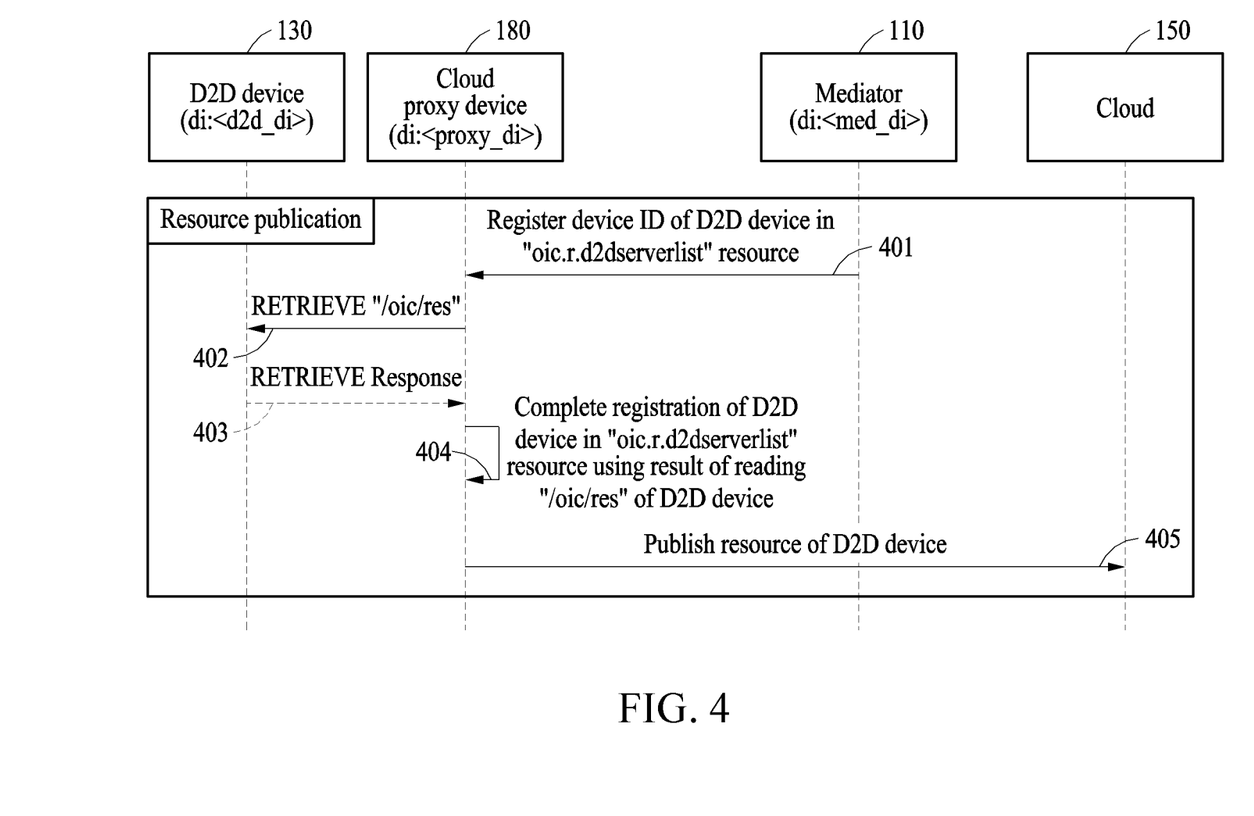
FIG. 4 is a diagram illustrating an example of a flow of operations performed to register a resource of a D2D device in a cloud according to an example embodiment.

FIG. 4 is a diagram illustrating an example of a flow of operations performed to register a resource of a D2D device in a cloud according to an example embodiment.

In operation 401, the mediator 110 may request the cloud proxy device 180 for registration of the D2D device 130 (or registration of a resource of the D2D device 130). When requesting the registration of the D2D device 130, the mediator 110 may transmit a device ID (e.g., <d2d_di>) of the D2D device 130 to the cloud proxy device 180. The request for the registration of the D2D device 130 may include the device ID (<d2d_di>) of the D2D device 130.

In operations 402 and 403, the cloud proxy device 180 may access the D2D device 130 and obtain a resource (e.g., "/oic/res") of the D2D device 130.

In operation 404, the cloud proxy device 180 may register (and update) a result of retrieving a resource of the D2D device 130, for example, the resource ("/oic/res") of the D2D device 130, in a resource (e.g., oic.r.d2dserverlist) of a mapping list (D2DServerList). The cloud proxy device 180 may generate and store a new D2D server (d2dserver) object entry in the resource (oic.r.d2dserverlist) based on the resource ("/oic/res") and the device ID (<d2d_di>) of the D2D device 130.

In operation 405, the cloud proxy device 180 may transmit (or publish) the resource of the D2D device 130 to the cloud 150 (e.g., the resource directory 160). The cloud 150, for example, the resource directory 160, may register therein the resource of the D2D device 130.

Figure 5:
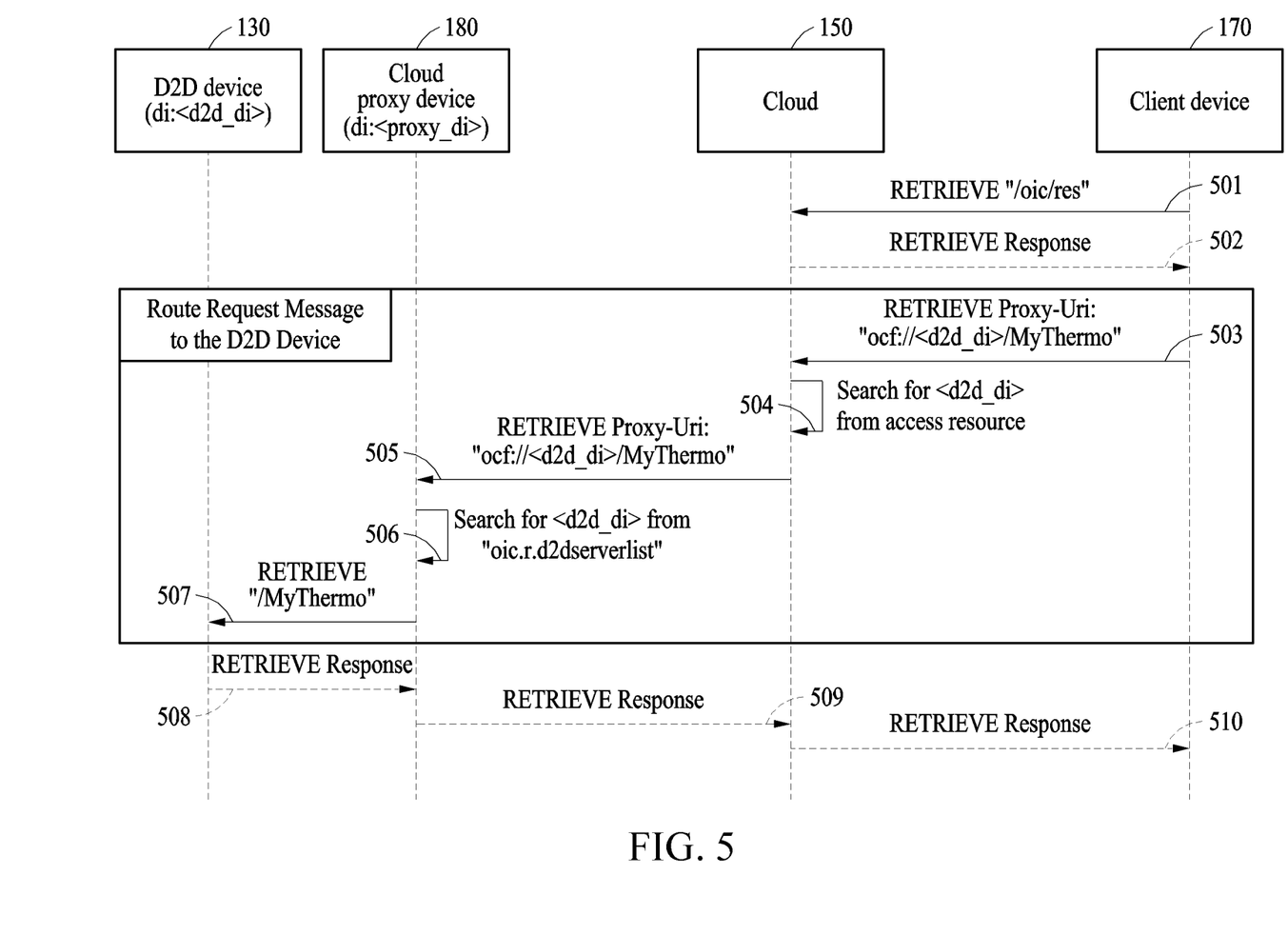
FIG. 5 is a diagram illustrating an example of a flow of operations of communicating through a cloud proxy device according to an example embodiment.

FIG. 5 is a diagram illustrating an example of a flow of operations of communicating through a cloud proxy device according to an example embodiment.

Communication operations performed through the cloud proxy device 180 may include an operation in which the client device 170 communicates with the D2D device 130 through the cloud proxy device 180.

In operations 501 and 502, the client device 170 may access the cloud 150, for example, the resource directory 160, and obtain information of all resources (e.g., "/oic/res") that are accessible through the cloud 150. In detail, when the client device 170 requests the cloud 150 (e.g., the resource directory 160) for a resource retrieval in operation 501, the cloud 150 (e.g., the resource directory 160) may transmit a response to the resource retrieval to the client device 170 in operation 502. The response transmitted from the cloud 150 (e.g., the resource directory 160) may include an URI of each resource. A device ID of the D2D device 130 to which each resource belongs may be prefixed to the URI of each resource, for example, as shown in "href": "/<d2d_di>/MyThermo," in which <d2d_di>/ may be a value corresponding to the device ID, for example, a universally unique identifier (UUID).

In operation 503, the client device 170 may transmit, to the cloud 150 (e.g., the resource directory 160), a resource retrieval request (e.g., proxy URI example: "ocf://<d2d_di>//MyThermo") of the D2D device 130. The client device 170 may extract the device ID from the URI of each resource, convert the device ID to a proxy-URI option header (e.g., as specified in RFC7252), and transmit the resource retrieval request (e.g., proxy-URI example: "ocf://<d2d_di>//MyThermo") of the D2D device 130 including the proxy-URI option header to the cloud 150 (e.g., the resource directory 160). The proxy-URI option header may include the device ID.

In operation 504, the cloud 150 may search for an account resource using, as a key, the device ID included in the proxy-URI (e.g., the proxy-URI option header). There may be the two following cases.

(a) Case A: when matched to the device ID "di" of an account resource entry

This is when an owner of a resource for which the client device 170 transmits a retrieval request is the D2C device 120 with a cloud interworking function (e.g., D2C). In this case, the cloud proxy device 180 may not engage.

(b) Case B: when discovering a matching one in "proxied_dis" of an account resource entry The is when an owner of a resource for which the client device 170 transmits a retrieval request is the D2D device 130 without the client interworking function (e.g., D2C). In this case, the cloud proxy device 180 may engage. In this case, a device ID (<proxy_di>) of the cloud proxy device 180 may be an attribute value "di" of the account resource entry.

In operation 505, in the Case B where the owner of the resource for which the client device 170 transmits the retrieval request is the D2D device 130 without the cloud interworking function (e.g., D2C), the cloud 150 may forward the resource retrieval request (e.g., proxy-URI: "ocf://<d2d_di>//MyThermo") transmitted from the client device 170 using "di" (e.g., the device ID (<proxy_di>) of the cloud proxy device 180) discovered from the account resource. For example, the cloud 150 may forward the resource retrieval request (e.g., proxy-URI: "ocf://<d2d_di>//MyThermo") to the cloud proxy device 180.

In operation 505, the cloud 150 may not remove the proxy-URI option header from the resource retrieval request. Not removing the proxy-URI option header may be because the cloud 150 is not a final device to be connected directly to the D2D device 130 having the device ID (<d2d_di>) included in the proxy-URI option header. The cloud 150 may be one that forwards the resource retrieval request (proxy-URI: "ocf:// <d2d_di>//MyThermo") to a next destination (e.g., the cloud proxy device 180 (<proxy_di>) stored in the "di" attribute (e.g., "/oic/sec/account:di") of the account resource ("oic.r.account").

In operation 506, the cloud proxy device 180 may receive the resource retrieval request (proxy-URI: "ocf://<d2d_di>//MyThermo") of the client device 170 that is transmitted from the cloud 150, extract the device ID (<d2d_di>) included in the proxy-URI option header, and search for a resource (e.g., oic.r.d2dserverlist) based on the device ID (<d2d_di>).

In operation 507, the cloud proxy device 180 may transmit the resource retrieval request of the client device 170 to the D2D device 130 based on a retrieval result (e.g., RETRIEVE "//MyThermo"). The retrieval result may include the device ID and endpoint information of the D2D device 130 which is a final destination of the resource retrieval request of the client device 170. The cloud proxy device 180 may remove the proxy-URI option header and transmit the resource retrieval request (e.g., RETRIEVE "//MyThermo") of the client device 170 to the D2D device 130.

In operation 508, the D2D device 130 may transmit a response to the cloud proxy device 180 of the cloud 150 in response to the resource retrieval request. In operations 509 and 510, the response of the D2D device 130 may be transmitted in order of cloud proxy→OCF cloud→OCF cloud client.

Figure 6:
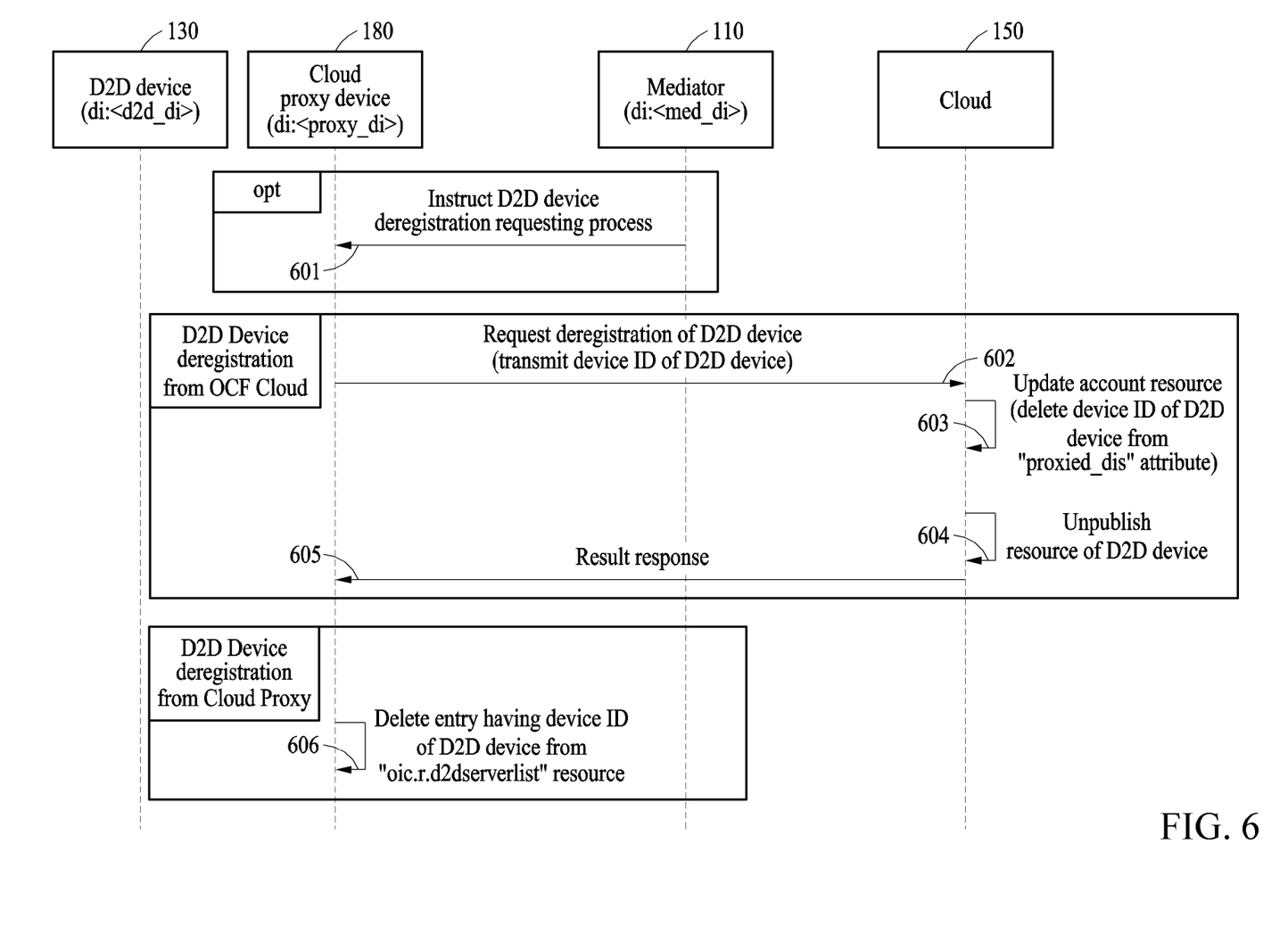
FIG. 6 is a diagram illustrating an example of a flow of operations performed to deregister a D2D device from a cloud according to an example embodiment.

FIG. 6 is a diagram illustrating an example of a flow of operations performed to deregister a D2D device from a cloud according to an example embodiment.

In operation 601, the mediator 110 may instruct the cloud proxy device 180 a deregistration requesting process to request deregistration of the D2D device 130.

In operation 602, the cloud proxy device 180 may request the cloud 150 for the deregistration of the D2D device 130 in order to delete the D2D device 130 from the cloud 150. In the request for the deregistration, the cloud proxy device 180 may transmit a device ID (e.g., <d2d_di>) of the D2D device 130 to the cloud 150. The request for the deregistration of the D2D device 130 may include the device ID (e.g., <d2d_di>) of the D2D device 130.

In operation 603, in response to the request for the deregistration, the cloud 150 may update an account resource. The cloud 150 may search for the account resource, and delete the device ID (<d2d_di>) of the D2D device 130 from an attribute (e.g., "proxied_dis" attribute) of the account resource. The cloud 150 may delete all resources published by the D2D device 130.

In operation 604, the cloud 150 may unpublish the resources of the D2D device 130. In operation 605, the cloud 150 may transmit a response to the request for the deregistration to the cloud proxy device 180.

In operation 606, the cloud proxy device 180 may search for the device ID (<d2d_di>) of the D2D device 130 from a resource (oic.r.d2dserverlist), and delete an object (d2dserver) corresponding to the device ID (<d2d_di>) of the D2D device 130.

Although the operations of the cloud 150 described above with reference to FIGS. 3 through 6 are described as being performed by the cloud 150 for the convenience of description, examples of which are not limited thereto. The operations may be performed by the resource directory 160.

The example embodiments described herein relate to a method and process of interworking, with the cloud 150, the D2D device 130 in which a function of interworking with the cloud 150 is not provided, using the cloud proxy device 180. Even a lightweight IoT device with extremely limited hardware may enable remote access and control through cloud interworking, using such a proxy function. Thus, it is possible to implement various applications and usages in various environments where IoT is used.

Figure 7:
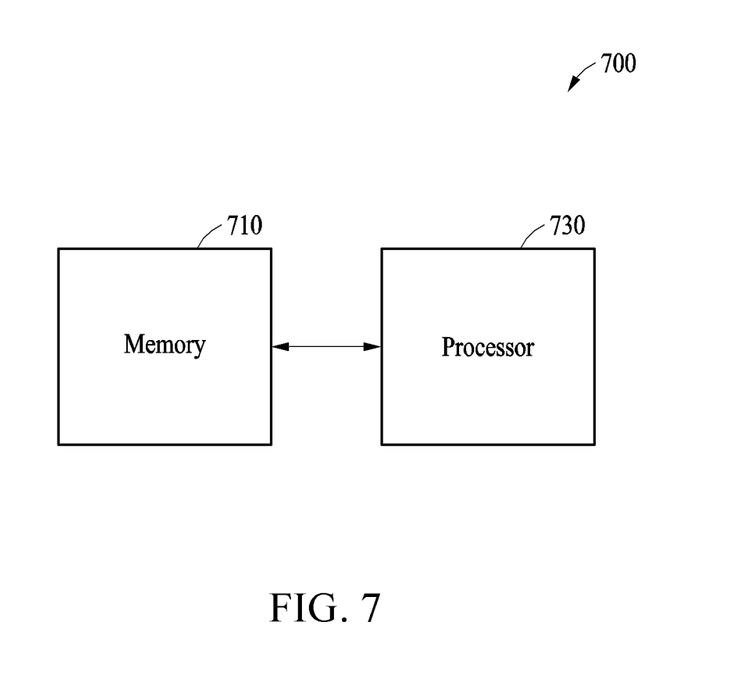
FIG. 7 is a diagram illustrating an example of a cloud proxy device according to an example embodiment.

FIG. 7 is a diagram illustrating an example of a cloud proxy device according to an example embodiment.

A cloud proxy device 700 may be substantially the same as the cloud proxy device 180 that provides a proxy function described above with reference to FIGS. 1 through 6. The cloud proxy device 700 may include a memory 710 and a processor 730.

The memory 710 may store therein instructions (or program) executable by the processor 730. The instructions may include, for example, instructions for executing operations of the processor 730 and/or instructions for executing operations of each component of the processor 730.

The processor 730 may process data stored in the memory 710. The processor 730 may execute computer-readable code (e.g., software) stored in the memory 710 and instructions induced by the processor 730.

The processor 730 may be a hardware-implemented data processing device having a physically structured circuit to execute desired operations. The desired operations may include, for example, code or instructions included in a program.

The hardware-implemented data processing device may include, for example, a microprocessor, a central processing unit (CPU), a processor core, a multi-core processor, a multiprocessor, an application-specific integrated circuit (ASIC), a field-programmable gate array (FPGA), and the like.

The operations to be performed by the processor 730 may be substantially the same as the operations performed by the cloud proxy device 180 described above with reference to FIGS. 1 through 6, and thus a detailed and repeated description of the operations will be omitted here for conciseness.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer-readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A cloud access method using a cloud proxy function, comprising:
   receiving, from a cloud, a first request for resource retrieval of a client device;
   extracting, from the first request for resource retrieval, a device identification (ID) of a device comprising a resource for which the resource retrieval is requested; and
   transmitting, to the device, a second request for resource retrieval based on the device ID, the second request being modified from the first request by the cloud proxy function.

2. The cloud access method of claim 1, wherein:
   the first request for resource retrieval comprises a proxy-uniform resource identifier (URI) option header, and
   the proxy-URI option header is removed from the second request for resource retrieval.

3. The cloud access method of claim 2, wherein the proxy-URI option header comprises the device ID.

4. The cloud access method of claim 2, comprising:
   receiving a request for registration of the device from a mediator;
   obtaining the resource of the device; and
   publishing the resource of the device to the cloud.

5. The cloud access method of claim 4, comprising:
   generating an object entry corresponding to the device based on the resource and the device ID of the device and storing the generated object entry.

6. The cloud access method of claim 1, wherein the device has no cloud interworking function of interworking with the cloud.

7. The cloud access method of claim 1, wherein the transmitting comprises:
   searching for the device ID and endpoint information of the device from a mapping list that is used for managing device-to-device (D2D) devices that have no cloud interworking function of interworking with the cloud.

8. The cloud access method of claim 1, further comprising:
   requesting the cloud for registration of a cloud proxy device that supports the cloud proxy function; and
   receiving an access token for the cloud proxy device that is issued by the request for the registration.

9. The cloud access method of claim 1, wherein the first request for resource retrieval is a resource retrieval request forwarded by the cloud after being transmitted from the client device to the cloud.

10. A computer program embodied on a non-transitory computer readable medium, the computer program being configured to control a processor to:
    receive, from a cloud, a first request for resource retrieval of a client device;
    extract, from the first request for resource retrieval, a device identification (ID) of a device comprising a resource for which the resource retrieval is requested; and
    transmit, to the device, a second request for resource retrieval based on the device ID, the second request being modified from the first request by the cloud proxy function.

11. A cloud proxy device supporting a cloud proxy function, comprising:
    a memory configured to store therein at least one instruction; and
    a processor configured to execute the instruction,
    wherein, when the instruction is executed, the processor is configured to:
      receive, from a cloud, a first request for resource retrieval of a client device;
      extract, from the first request for resource retrieval, a device identification (ID) of a device-to-device (D2D) device comprising a resource for which the resource retrieval is requested; and
      transmit, to the D2D device, a second request for resource retrieval based on the device ID, the second request being modified from the first request by the cloud proxy function.

12. The cloud proxy device of claim 11, wherein:
    the first request for resource retrieval comprises a proxy-uniform resource identifier (URI) option header, and
    the proxy-URI option header is removed from the second request for resource retrieval.

13. The cloud proxy device of claim 12, wherein the proxy-URI option header comprises the device ID.

14. The cloud proxy device of claim 12, wherein the processor is further configured to:
    receive a request for registration of the D2D device from a mediator;
    obtain the resource of the D2D device; and
    publish the resource of the D2D device to the cloud.

15. The cloud proxy device of claim 14, wherein the processor is further configured to:
   generate an object entry corresponding to the D2D device based on the resource and the device ID of the D2D device and store the generated object entry.

16. The cloud proxy device of claim 11, wherein the D2D device has no cloud interworking function of interworking with the cloud.

17. The cloud proxy device of claim 11, wherein, when the second request for resource retrieval is transmitted, the processor is further configured to:
   search for the device ID and endpoint information of the D2D device from a mapping list that is used for managing devices that have no cloud interworking function of interworking with the cloud.

18. The cloud proxy device of claim 11, wherein the process is further configured to:
   request the cloud for registration of the cloud proxy device; and
   receive an access token for the cloud proxy device that is issued by the request for the registration.

19. The cloud proxy device of claim 18, wherein the processor is further configured to:
   request the cloud for the registration of the cloud proxy device in response to cloud setting provisioning of a mediator.

20. The cloud proxy device of claim 11, wherein the first request for resource retrieval is a resource retrieval request that is forwarded by the cloud after being transmitted from the client device to the cloud.

* * * * *